(12) United States Patent
Thompson et al.

(10) Patent No.: US 7,967,892 B2
(45) Date of Patent: Jun. 28, 2011

(54) IN-LINE DEAERATING SYSTEM FOR AQUATIC SPECIES CONTROL

(75) Inventors: Claude R. Thompson, Virginia Beach, VA (US); William M. Lechler, Virginia Beach, VA (US); Neil F. Marshall, Williamsburg, VA (US)

(73) Assignee: Sea Knight Corporation, Virginia Beach, VA (US)

( * ) Notice: Subject to any disclaimer, the term of this patent is extended or adjusted under 35 U.S.C. 154(b) by 484 days.

(21) Appl. No.: 12/288,362

(22) Filed: Oct. 20, 2008

(65) Prior Publication Data

US 2009/0101006 A1     Apr. 23, 2009

Related U.S. Application Data

(60) Provisional application No. 61/000,103, filed on Oct. 23, 2007.

(51) Int. Cl.
*B01D 19/00*     (2006.01)
*C02F 1/20*     (2006.01)

(52) U.S. Cl. ............... 95/8; 95/248; 95/262; 96/198; 96/156; 210/931; 210/170.09; 210/170.1

(58) Field of Classification Search ............... 95/248, 95/262, 8, 260, 249; 96/198, 156, 194; 210/931, 210/170.09, 170.1, 170.11
See application file for complete search history.

(56) References Cited

U.S. PATENT DOCUMENTS

| | | | | |
|---|---|---|---|---|
| 1,824,498 A | * | 9/1931 | Rodman et al. | 208/184 |
| 1,836,338 A | * | 12/1931 | Rodman et al. | 96/198 |
| 6,391,094 B2 | * | 5/2002 | Ramos | 95/248 |

* cited by examiner

*Primary Examiner* — Duane Smith
*Assistant Examiner* — Douglas J Theisen
(74) *Attorney, Agent, or Firm* — Peter J. Van Bergen

(57) ABSTRACT

A water deaerating system and method are provided. The first end of an open-ended conduit is placed beneath the surface of a body of oxygen-rich water. The conduit extends into a housing and where the second end of the conduit resides at a location in the housing that is above the surface of the body of oxygen-rich water. A vacuum is applied to a spatial region defined within the housing above the location of the second end of the conduit. The oxygen-rich water is pumped through the conduit and exits the second end of the conduit to enter the spatial region of the housing. The oxygen-rich water descends through the housing due to gravity. The oxygen-rich water's descension is interrupted and the vacuum operates to remove oxygen from the oxygen-rich water so-descending to generate oxygen-depleted water.

20 Claims, 3 Drawing Sheets

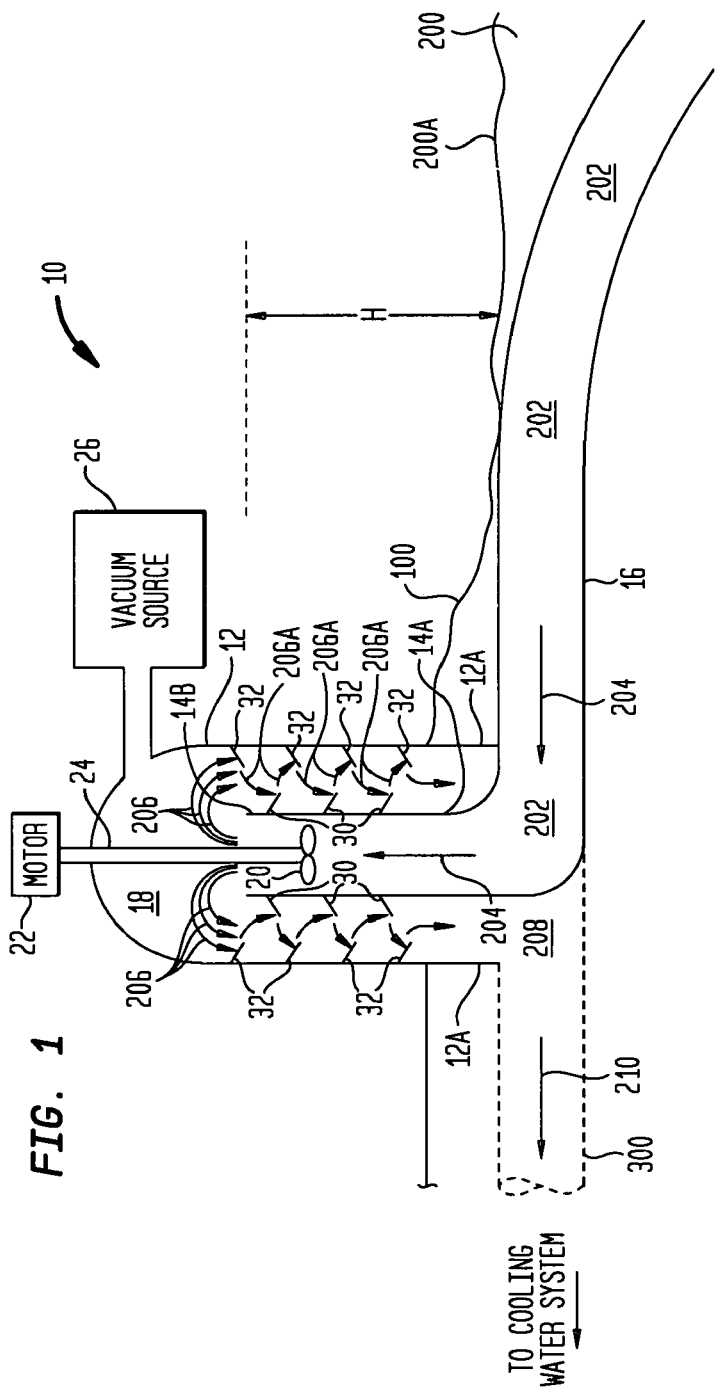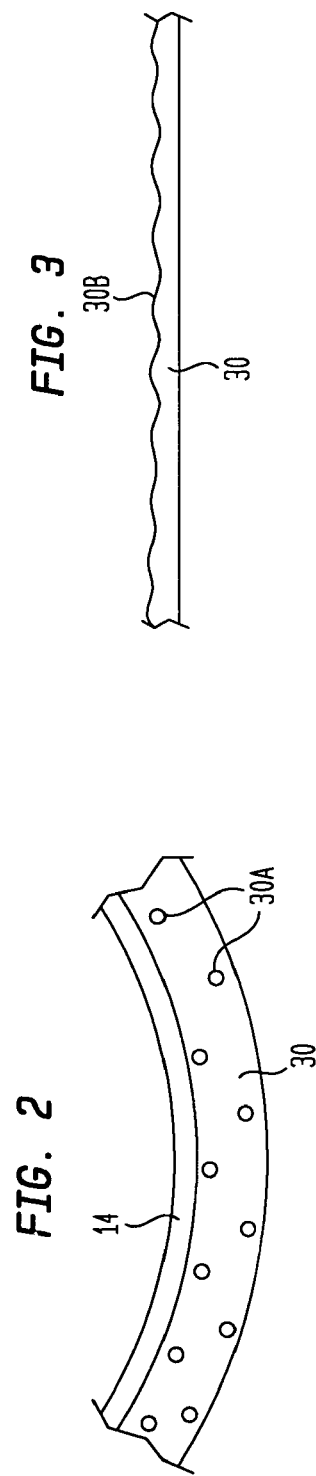

IN-LINE DEAERATING SYSTEM FOR AQUATIC SPECIES CONTROL

ORIGIN OF THE INVENTION

Pursuant to 35 U.S.C. §119, the benefit of priority from provisional application 61/000,103, with a filing date of Oct. 23, 2007, is claimed for this non-provisional application.

FIELD OF THE INVENTION

The invention relates generally to deaerating systems, and more particularly to a deaerating system that can be placed at the front end of a cooling water intake line and be used to control/prevent the colonization of aquatic species (e.g., zebra mussels) within the cooling water intake line.

BACKGROUND OF THE INVENTION

Zebra mussels are small bivalve creatures that live in large densities in rivers and lakes in North America and Europe. They attach themselves to any hard surface using adhesive byssal threads. Zebra mussels are particularly problematic for electric power plants or any industrial plant that draws its cooling water directly from a nearby river or lake. The zebra mussels are drawn from the river/lake by the cooling water delivery system and ultimately end up in cooling water pipes. Left unchecked, the zebra mussels attach themselves to the delivery system and/or cooling water pipes' inner walls. As the colonies of zebra mussels grow on/in the systems and/or pipe walls, cooling water flow decreases. Reduction in cooling water can lead to power outrages and/or equipment failures. Currently, industry employs various post-colonization procedures to remove the zebra mussels from the inner walls of cooling water intake pipes. These methods typically involve the use of chemical biocides that, unfortunately, can be toxic to local non-harmful organisms and/or deposit/produce substances that may be carcinogenic.

SUMMARY OF THE INVENTION

Accordingly, it is an object of the present invention to provide a system and method that prevent the colonization of zebra mussels on the inside walls of cooling water intake pipes.

Another object of the present invention is to provide a system and method that treats a plant's cooling water to prevent zebra mussel colonization in the cooling water system without harming other local species.

Still another object of the present invention is to provide a system and method that treats a plant's cooling water to prevent zebra mussel colonization in the cooling water system without the use of chemical biocides.

Other objects and advantages of the present invention will become more obvious hereinafter in the specification and drawings.

In accordance with the present invention, a water deaerating system and method are provided. The first end of an open-ended conduit is placed beneath the surface of a body of oxygen-rich water. The conduit extends into a housing and where the second end of the conduit resides at a location in the housing that is above the surface of the body of oxygen-rich water. A spatial region is defined within the housing above the location of the second end of the conduit. A vacuum source coupled to the housing applies a vacuum to the spatial region. The oxygen-rich water is pumped through the conduit so that the oxygen-rich water exits the second end of the conduit and enters the spatial region of the housing. The oxygen-rich water entering the spatial region then descends through the housing due to gravity. Beneath the spatial region are obstructions or interruptions that interrupt the oxygen-rich water's descension through the housing. The vacuum operates to remove oxygen from the oxygen-rich water so-descending through the housing to generate oxygen-depleted water.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of an open-circuit, in-line deaerating system for use with the front end of a cooling water system in accordance with an embodiment of the present invention;

FIG. 2 is a top view of a portion of an embodiment of a ledge disposed in the deaerating system;

FIG. 3 is an end view of a portion of another embodiment of a ledge disposed in the deaerating system;

DETAILED DESCRIPTION OF THE INVENTION

Figure 4:
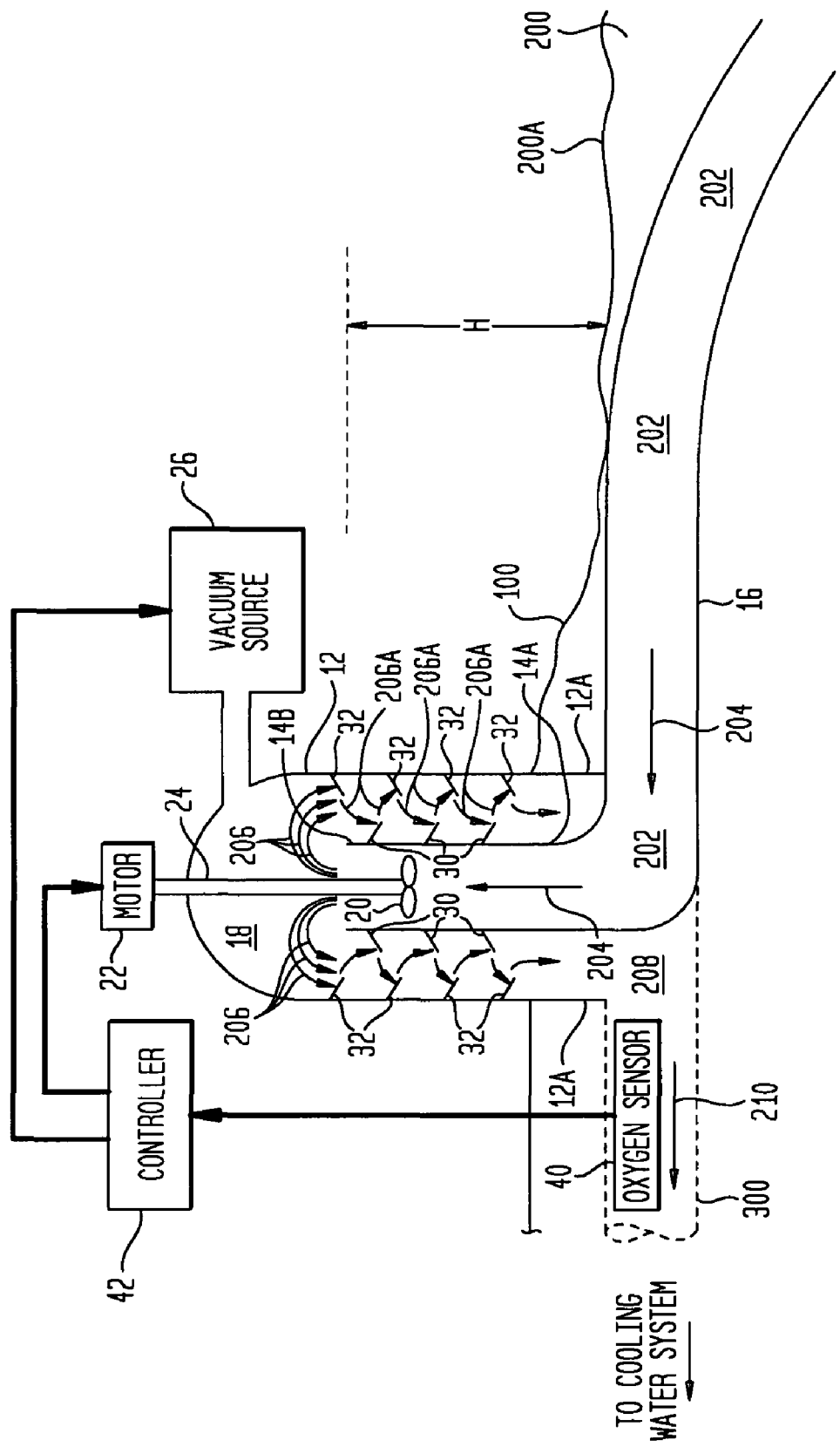
FIG. 4 is a schematic view of a closed-circuit, in-line deaerating system in accordance with another embodiment of the present invention.

Referring now to the drawings, and more particularly to FIG. 1, an in-line deaerating system in accordance with the present invention is shown and is referenced generally by numeral 10. Deaerating system 10 will typically be located at or near the shore 100 of a river or lake 200, and be coupled to the front end of a cooling water intake pipe 300 that leads to a cooling water system (not shown). It is to be understood that cooling water intake pipe 300 and the cooling water system are not part of, or limitations on, the present invention. Accordingly, cooling water intake pipe 300 is illustrated by dashed lines to clearly delineate it from deaerating system 10. The cooling water system could be one used by a power plant or any other type of industrial facility without departing from the scope of the present invention.

Deaerating system 10 has an enclosed columnar housing 12 with its base 12A mounted on shore 100 or embedded in shore 100 as illustrated. Centrally disposed in housing 12 is an open-ended conduit 14 that is vertically oriented in the illustrated embodiment such that an annular region is formed between the inner walls of housing 12 and the outer walls of conduit 14. The cross-sectional geometries of housing 12 and conduit 14 can be the same or different, and can be circular, rectangular, regular, irregular, etc., without departing from the scope of the present invention. One open end 14A of conduit 14 is coupled to an open-ended intake conduit 16 that leads into river or lake 200. The other open end 14B of conduit 14 resides in housing 12 at a selected height H above the surface 200A of river or lake 200 such that a space 18 is defined above open end 14B. Open end 14B can be directed upward (as shown) in a direction substantially parallel to the force of gravity. However, the present invention is not so limited as open end 14B could also be angularly oriented with respect to the force of gravity.

Positioned in conduit 14 is an impeller 20 that, when rotated by a drive motor 22 (via a rotating shaft 24), pulls raw water 202 from river/lake 200 into and through intake conduit 16 and conduit 14 in the direction indicated by flow arrows 204. It is to be understood that impeller 20 could be disposed at other locations in conduit 14 or in conduit 16 without departing from the scope of the present invention. Accordingly, the location of motor 22 is also not limited to the illustrated location thereof. In addition, impeller 20 and motor 22 could be an integrated assembly in which case they could be co-located. Still further, the functions provided by impeller 20 and motor 22 could be achieved using other devices/systems as would be understood by one of ordinary skill in the art.

A vacuum source 26 is coupled to the internal portion of housing 12 at one or more regions thereof above open end 14B of conduit 14 such that vacuum source 26 is in communication with space 18. The vacuum applied to space 18 is contained by housing 12 or by the combination of housing 12 and the water that collects at the base of housing 12 as will be explained further below.

Disposed about the external periphery of conduit 14 are a series of annular ledges 30. In this embodiment, each annular ledge 30 is angled or sloped towards the surface 200A of river/lake 200. Disposed about the internal periphery of housing 12 are a series of annular ledges 32. Each annular ledge 32 is also angled or sloped towards the surface 200A of the river/lake 200. By sloping ledges 30 and 32 in this fashion, water striking the top surfaces of ledges 30 and 32 briefly adheres thereto owing to surface tension, but then is shed therefrom under the force of gravity. Annular ledges 30 and 32 are staggered or interleaved in terms of their vertical position as illustrated for reasons that will be explained further below.

Each of ledges 30 and 32 can present a solid, flat surface. However, the present invention is not so limited. For example, as illustrated in a partial top view of a single ledge 30 shown in FIG. 2 having a perimeter geometry that corresponds to the outer surface of conduit 14, through holes 30A can be provided in ledge 30 thereby making the ledge porous. The ledges could also present an uneven surface such as the ribbed or undulating surface 30B illustrated in the partial end view of a single ledge 30 shown in FIG. 3. Ledges 32 could be similarly constructed/configured. Further, ledges 30 and 32 can be constructed differently and/or be canted towards the surface 200A at different angles without departing from the scope of the present invention.

In operation, impeller 20 is turned (via motor 22/shaft 24) to generate flow 204 of raw water 202. At the same time, vacuum source 26 applies a vacuum to space 18 in order to evacuate same. As raw water 202 spills annularly out of open end 14B of vertical conduit 14 (as indicated by flow arrows 206), the vacuum in space 18 acts on raw water flow 206 to remove dissolved oxygen therefrom. The annular distribution of raw water flow 206 increases the surface area thereof exposed to the vacuum in space 18. At the same time, earth's gravity force causes raw water flow 206 to be directed towards the bottom of housing 12 as indicated.

Housing 12 will typically be made from a material having good compression attributes (e.g., concrete) to insure housing integrity when vacuum source 26 is operated. In order to optimize dissolved oxygen removal, the present invention uses ledges 30 and 32 to interrupt water flow 206 thereby increasing (i) the surface area of raw water flow 206 exposed to the vacuum, and (ii) the time that raw water flow 206 is exposed to the vacuum. With ledges 30 and 32 arranged in a staggered/stepped vertical relationship as shown, the raw water flows in a stepped fashion as indicated by flow arrows 206A. As a result, oxygen-depleted water 208 is deposited about the bottom of conduit 14. From here, oxygen-depleted water 208 is available for entry into intake pipe 300 where it can be drawn for use by the cooling water system (not shown) coupled to intake pipe 300.

The advantages of the present invention are numerous. By removing dissolved oxygen from the raw water flow, the present invention provides a supply of oxygen-depleted cooling water that will not support the growth and colonization of zebra mussels. The oxygen-depleted cooling water also reduces the zebra mussels' ability to attach to the walls of the intake pipe thereby casuing them to simply be transported along intake pipe 300 (in the direction indicated by flow arrow 210) for easy filtering/removal by existing cooling water system filtration mechanisms. This eliminates the need to "scrub" intake pipe 300. Further, the present invention achieves its prevention approach in an environmentally-friendly fashion since no chemical biocides are used.

The present invention is not limited to the open-circuit deaerating system presented in FIG. 1. Indeed, another variation of the present invention uses closed-loop control of motor 22 and/or vacuum source 26. Such a closed-loop system is illustrated in FIG. 4 where an oxygen sensor 40 is disposed in oxygen-depleted water 208. Multiple oxygen sensors could also be used without departing from the scope of the present invention. The output of oxygen sensor 40 is supplied to a controller 42 programmed to monitor the oxygen content detected by sensor 40. The oxygen content is then used in a control algorithm to control operation of motor 22 and/or vacuum source 26. The control algorithm would typically be governed by an oxygen content of approximately 4 parts per million (ppm) since oxygen levels in water must generally be maintained below this level to ensure zebra mussel population control as well as reduce the zebra mussels' ability to attach themselves to walls.

Figure 5:
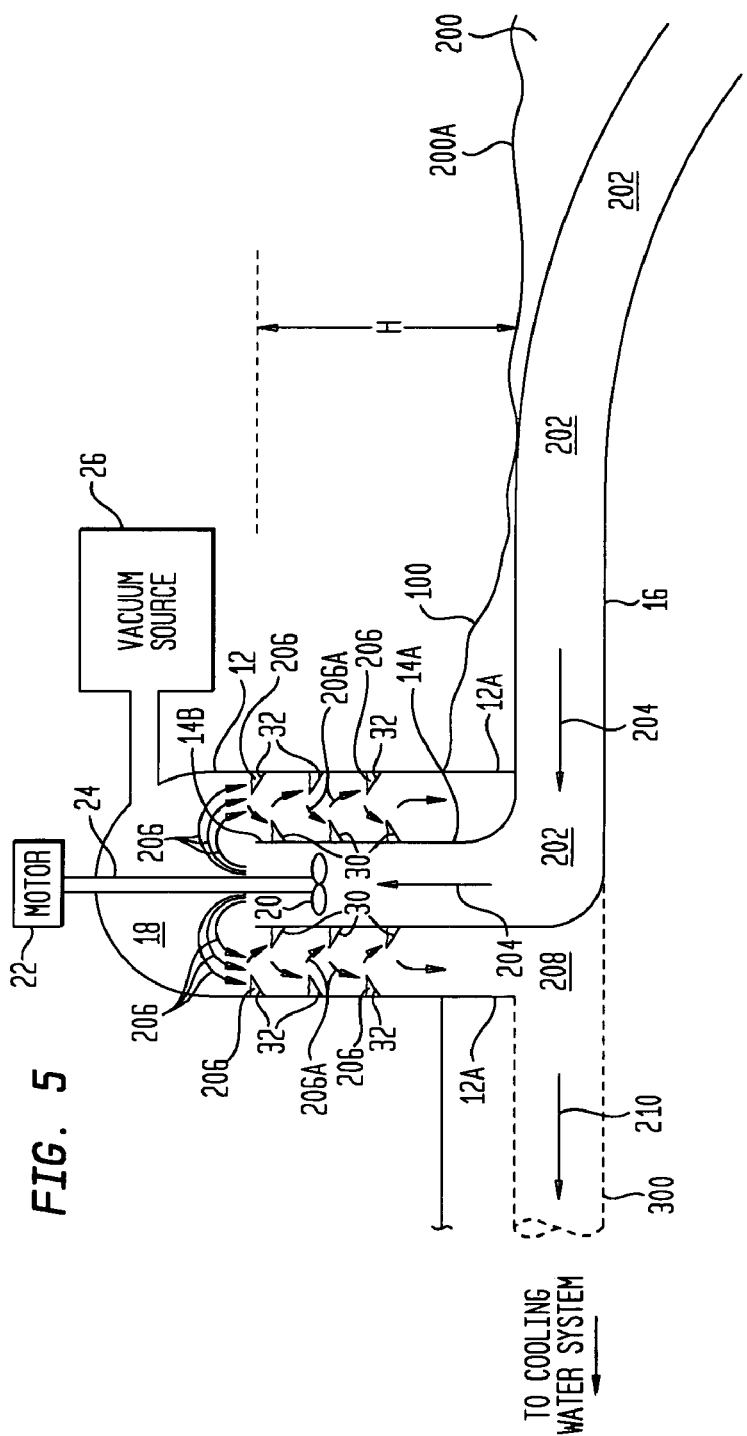
FIG. 5 is a schematic view of an in-line deaerating system using upward canted ledges in accordance with another embodiment of the present invention.

The present invention is also not limited to the use of downward-canted ledges as illustrated by the embodiment shown in FIG. 5 where ledges 30 and 32 are canted upwards. Thus, gravity will cause each ledge to form a pooling area that temporarily fills with raw water 206 before spilling down onto the next ledge as indicated by flow arrows 206A. In this way, the amount of time that raw water 206 is exposed to the vacuum (applied by vacuum source 26) is further increased.

Maintenance of the present invention can be enhanced by making conduits 14 and 16 in modular sections since these conduits are exposed to raw, oxygen-rich water with zebra mussels. In this way, if a section of these conduits becomes "coated" with zebra mussels, the affected section can be quickly removed/replaced. Further, the present invention can incorporate a bypass feature (not shown) that allows raw water 202 to bypass the deaerating system to thereby provide for system maintenance and/or bypass of the system when the zebra mussel population is decreased (e.g., when the raw water is cold).

Figure 7:
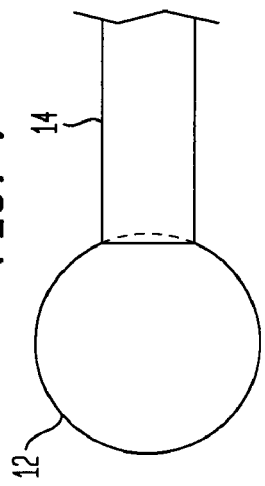
FIG. 7 is an isolated plan view of the housing and conduit in accordance with still another embodiment of the present invention.
Figure 6:
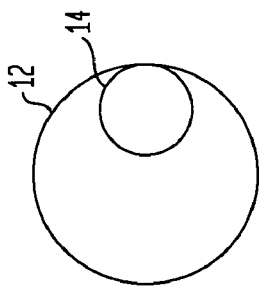
FIG. 6 is an isolated plan view of the housing and conduit in accordance with another embodiment of the present invention.

Although the invention has been described relative to specific embodiments thereof, there are numerous variations and modifications that will be readily apparent to those skilled in the art in light of the above teachings. For example, the ledges in the present invention could be positioned horizontally, or replaced, changed and/or complemented with other devices or structures that increase the amount of time that raw water 206 is exposed to the vacuum and/or increase the surface area of raw water 206 that is exposed to the vacuum as the raw water cascades down through housing 12. Further, in some applications, conduit 14 could be located adjacent to an inner wall of housing 12 in which case a substantially annular region would be defined about conduit 14 as illustrated in FIG. 6 where just the housing and conduit are shown in a plan view. Still other applications may only require open end 14B of conduit 14 to pass through a side wall of housing 12 (as shown in the FIG. 7 plan view) and be located in housing 12 at a location above the surface 200A of river/lake 200. It is therefore to be understood that, within the scope of the appended claims, the invention may be practiced other than as specifically described.

What is claimed as new and desired to be secured by Letters Patent of the United States is:

1. A water deaerating system, comprising:
a housing;
an open-ended conduit having a first end and a second end, said first end adapted to be placed beneath the surface of a body of oxygen-rich water, said conduit extending into said housing wherein said second end resides at a location in said housing that is above the surface of the body of oxygen-rich water, and wherein a spatial region is defined within said housing above said location;
a vacuum source coupled to said housing for applying a vacuum to said spatial region;
pumping means for pumping the oxygen-rich water through said conduit, wherein the oxygen-rich water exits said second end of said conduit and enters said spatial region of said housing, and wherein the oxygen-rich water in said spatial region descends through said housing due to gravity; and
dispersing means disposed in said housing beneath said spatial region thereof for interrupting the oxygen-rich water's descension through said housing, wherein said vacuum removes oxygen from the oxygen-rich water so-descending to generate oxygen-depleted water.

2. A water deaerating system as in claim 1, further comprising:
sensing means for detecting oxygen levels in the oxygen-depleted water; and
control means coupled to said sensing means and at least one of said vacuum source and said pumping means for controlling at least one of said vacuum and said pumping of the oxygen-rich water through said conduit based on said oxygen levels so-detected.

3. A water deaerating system as in claim 1, wherein said dispersing means comprises a plurality of ledges coupled to at least one of said housing and said conduit.

4. A water deaerating system as in claim 3, wherein a portion of said ledges are coupled to said housing and a remainder of said ledges are coupled to said conduit.

5. A water deaerating system as in claim 3, wherein at least a portion of said ledges are porous.

6. A water deaerating system as in claim 3, wherein at least a portion of said ledges have uneven surfaces.

7. A water deaerating system as in claim 4, wherein vertical positions of said portion of said ledges coupled to said housing are interleaved with vertical positions of said remainder of said ledges coupled to said conduit.

8. A water deaerating system as in claim 3, wherein at least a portion of said ledges are arranged to shed water due to gravity.

9. A water deaerating system as in claim 3, wherein at least a portion of said ledges are arranged to pool water due to gravity.

10. A water deaerating system, comprising:
a housing;
an open-ended conduit having a first end and a second end, said first end adapted to be placed beneath the surface of a body of oxygen-rich water, said conduit having a portion thereof extending in a substantially vertical orientation in said housing wherein said second end resides at a location in said housing that is above the surface of the body of oxygen-rich water, and wherein a spatial region is defined within said housing above said location;
a vacuum source coupled to said housing for applying a vacuum to said spatial region;
pumping means for pumping the oxygen-rich water through said conduit, wherein the oxygen-rich water exits said second end of said conduit and enters said spatial region of said housing, and wherein the oxygen-rich water in said spatial region descends through said housing due to gravity; and
dispersing means coupled to at least one of said housing and said conduit for interrupting the oxygen-rich water's descension through said housing, wherein said vacuum removes oxygen from the oxygen-rich water so-descending to generate oxygen-depleted water.

11. A water deaerating system as in claim 10, further comprising:
sensing means for detecting oxygen levels in the oxygen-depleted water; and
control means coupled to said sensing means and at least one of said vacuum source and said pumping means for controlling at least one of said vacuum and said pumping of the oxygen-rich water through said conduit based on said oxygen levels so-detected.

12. A water deaerating system as in claim 10, wherein said dispersing means comprises a plurality of ledges coupled to at least one of said housing and said conduit.

13. A water deaerating system as in claim 12, wherein a portion of said ledges are coupled to said housing and a remainder of said ledges are coupled to said conduit.

14. A water deaerating system as in claim 12, wherein at least a portion of said ledges are porous.

15. A water deaerating system as in claim 12, wherein at least a portion of said ledges have uneven surfaces.

16. A water deaerating system as in claim 13, wherein vertical positions of said portion of said ledges coupled to said housing are interleaved with vertical positions of said remainder of said ledges coupled to said conduit.

17. A water deaerating system as in claim 12, wherein at least a portion of said ledges are arranged to shed water due to gravity.

18. A water deaerating system as in claim 12, wherein at least a portion of said ledges are arranged to pool water due to gravity.

19. A method of deaerating water, comprising the steps of:
providing a housing and an open-ended conduit having a first end and a second end, wherein the first end is placed beneath the surface of a body of oxygen-rich water and the conduit extends into the housing with the second end residing at a location in the housing that is above the surface of the body of oxygen-rich water so that a spatial region is defined within the housing above the location;
applying a vacuum to the spatial region;
pumping the oxygen-rich water through the conduit, wherein the oxygen-rich water exits the second end of the conduit and enters the spatial region of said housing, and wherein the oxygen-rich water in the spatial region descends through the housing due to gravity; and interrupting the oxygen-rich water's descension through the housing, wherein the vacuum removes oxygen from the oxygen-rich water so-descending to generate oxygen-depleted water.

20. A method according to claim 19, further comprising the steps of:

detecting oxygen levels in the oxygen-depleted water; and
controlling at least one of said steps of applying and pumping based on said oxygen levels so-detected.

* * * * *